United States Patent
Fisher et al.

[15] 3,674,863
[45] July 4, 1972

[54] POLYVALENT IMMUNIZING AGENTS AND METHODS FOR THEIR PRODUCTION

[72] Inventors: Myron W. Fisher, Bloomfield Hills; Stephen Hanessian, Ann Arbor, both of Mich.

[73] Assignee: Parke, Davis & Company, Detroit, Mich.

[22] Filed: Dec. 8, 1969

[21] Appl. No.: 878,985

Related U.S. Application Data

[63] Continuation of Ser. No. 729,884, May 17, 1968, abandoned, which is a continuation of Ser. No. 704,995, Feb. 13, 1968, abandoned, which is a continuation-in-part of Ser. No. 619,179, Feb. 28, 1967, abandoned.

[52] U.S. Cl. ................................................................424/92
[51] Int. Cl. .........................................................A61k 7/16
[58] Field of Search ............................................424/87, 92

[56] References Cited

OTHER PUBLICATIONS

Alexander et al., Surgery, Gynecology & Obstetrics, Vol. 123, No. 5, pp. 965–977, Nov. 1966
Laborde et al., Journal of Bacteriology, Vol. 90, No. 1, pp. 290–291, July 1965
Millican et al., Journal of Infectious Diseases, Vol. 107, pp. 389–394, 1960

*Primary Examiner*—Richard L. Huff
*Attorney*—Robert R. Adams, David B. Ehrlinger, George M. Richards and Edward J. Gall

[57] ABSTRACT

Polyvalent antigens, including polyvalent vaccines, containing immunizing antigens from two or more selected strains of *Pseudomonas aeruginosa*. Optionally, the polyvalent antigens are administered to a host to produce an immune globulin. The immune globulin can be used in the form of a whole blood product, a plasma, a serum, or the isolated globulin. The products of the invention are capable of inducing protection against infection with a relatively high percentage of randomly-encountered strains of *Pseudomonas aeruginosa*.

28 Claims, No Drawings

POLYVALENT IMMUNIZING AGENTS AND METHODS FOR THEIR PRODUCTION

CROSS-REFERENCES TO RELATED APPLICATIONS

This is a continuation of our co-pending application, Ser. No. 729,884, filed May 17, 1968, which is a continuation of our co-pending application, Ser. No. 704,995, filed Feb. 13, 1968, which is a continuation-in-part of our co-pending application, Ser. No. 619,179, filed Feb. 28, 1967, all now abandoned.

SUMMARY AND DETAILED DESCRIPTION

The present invention relates to new polyvalent antigen products and polyvalent globulin products useful in immunizing against infection with Pseudomonas aeruginosa. As used herein the term "polyvalent" refers to the presence of two or more antigens or two or more antibodies having non-identical immunizing properties, such that the differences between the antigens or antibodies are recognizable by standard infection-protection tests involving challenge with dissimilar strains of the microorganism under study. These differences are also recognizable by appropriate standard serologic tests.

The polyvalent antigen products of the invention are produced by combining immunizing antigens obtained from certain particular strains of Pseudomonas aeruginosa. The particular strains of Pseudomonas aeruginosa which can optimally be employed in producing the new polyvalent antigen products of the invention were selected by examining and studying a large number of strains of Pseudomonas aeruginosa obtained from widely distributed locations. Cultures of each of the particular strains of Pseudomonas aeruginosa indicated above have been deposited in the culture collection of Parke, Davis & Company at Detroit, Michigan, and in the culture collection of the Northern Utilization Research and Development Division, U.S. Department of Agriculture, at Peoria, Illinois, under the numbers shown in the following table.

| Parke, Davis & Company Collection No. | Northern Utilization Research and Development Division Collection No. |
|---|---|
| 05074 | NRRL-B-3198 |
| 05139 | NRRL-B-3200 |
| 05140 | NRRL-B-3201 |
| 05141 | NRRL-B-3202 |
| 05142 | NRRL-B-3203 |
| 05143 | NRRL-B-3223 |
| 05144 | NRRL-B-3224 |

The NRRL designations in the foregoing table represent microorganisms of the exemplified characteristics and not merely individual cultures maintained in a specific culture collection. The principal characteristic which distinguishes each of the above stains from other strains of Pseudomonas aeruginosa is that each represents a different immunological type. Thus, the immunizing antigen obtained from strain NRRL-B-3198 identifies strain NRRL-B-3198 and distinguishes it from other strains of Pseudomonas aeruginosa.

In accordance with the invention, polyvalent antigen products of the invention are produced by combining immunizing antigens from the NRRL-B-3198 and NRRL-B-3200 strains of Pseudomonas aeruginosa. The polyvalent antigen products of the invention can, optionally, also contain one or more additional immunizing antigens from any of the NRRL-B-3201, NRRL-B-3202, NRRL-B-3203, NRRL-B-3223, and NRRL-B-3224 strains of Pseudomonas aeruginosa. A preferred polyvalent antigen product of the invention is one containing immunizing antigens from at least six and preferably from all seven of the designated strains. The polyvalent antigen products can be produced by preparing individual antigens and then combining them; by preparing a mixed antigen directly from a combination of two or more of the selected strains; or by modifications of these methods whereby the desired antigen mixture is made to appear in the final product. The polyvalent antigen products can be constituted from mixtures of crude antigens, partially purified antigens, or more highly purified antigens.

The essence of the invention as it relates to polyvalent antigen products is in the combination of immunizing antigens from the properly selected strains of Pseudomonas aeruginosa, rather than in the exact method by which each antigen is obtained. For example, the antigen can be extracted from the cell mass of a selected strain with any of a variety of extractants. Among the useful extractants are aqueous solutions of trichloroacetic acid, phenol, lithium bromide, lithium bromide-guanidine hydrochloride, perchloric acid, hydrochloric acid, sodium hydroxide or potassium hydroxide. A preferred extractant is aqueous trichloroacetic acid. In one method of operation, a wet cell mass is first washed one or more times with distilled water. The washed cell mass is suspended in cold distilled water, the mixture is blended and an aqueous solution of trichloroacetic acid is added with blending as before. The volume is adjusted with cold distilled water so that the final concentration of trichloroacetic acid is 8–16 percent (weight/volume), preferably 10–12 percent. The suspension is stirred at 0°–5° C. for 12 to 20 hours and then centrifuged. The supernatant aqueous solution is collected by decantation, the residual solid washed with water, and the washings added to the aqueous solution. The aqueous solution is washed with an organic solvent such as ether or ethyl acetate until it is neutral or only weakly acidic. The aqueous solution is aerated briefly to expel residual organic solvent, dialyzed against cold distilled water, and then lyophylized to give a crude Pseudomonas aeruginosa antigen characteristic of the strain or strains of Pseudomonas aeruginosa used in the procedure. The extraction procedure can be carried out on the cell mass of a single strain of Pseudomonas aeruginosa; or it can be carried out on the combined cell masses of two or more strains. The extraction procedure can also be carried out with any of a large number of extractants of the general type indicated above.

Also in accordance with the invention, the extracted antigens, either singly or in mixtures, such as in combination as one of the polyvalent antigens of the invention, can be purified in any of a number of ways. One such purification method is by reprecipitation of the antigen from an aqueous solution by the addition of a lower alkanol. For example, a crude antigen or mixture of antigens is dissolved in 0.1 N sodium acetate solution. The solution is cooled to 0°–5° C. and about six volumes of a water-miscible lower alkanol such as methanol or ethanol is added slowly. The precipitated antigen or mixture of antigens is collected and dissolved in water. The solution is dialyzed against distilled water and lyophylized to give the partially purified antigen or mixture of antigens.

Another method of purification is by fractionating an aqueous solution of an antigen or mixture of antigens on a suitable gel filtration or ion-exchange column. The column can be packed with any of a variety of different types of gel filtration and ion-exchange materials known in the art. Suitable agents include gel filtration materials obtained by cross-linking the polysaccharide dextran; polyacrylamide gel filtration materials; anion-exchangers produced by introducing diethylaminoethyl groups into gels obtained by cross-linking dextran; and anion-exchangers produced by introducing diethylaminoethyl groups into cellulose. Some materials which are commercially available at the present time and can be used for this purpose are sold under the names Sephadex, Bio-Gel, DEAE-Sephadex, and diethylaminoethyl cellulose. When using gel filtration materials for purification it is preferred to use those having a pore size appropriate to exclude particles having an approximate molecular weight greater than about 100,000–200,000. Under these conditions the purified antigens pass readily through the column while the passage of lower molecular weight impurities is delayed.

For example, a crude antigen or mixture of crude antigens is dissolved in a minimum volume of phosphate buffer at pH 7. The solution is added to a gel filtration column (previously equilibrated with phosphate buffer) of one of the types described above, and elution is continued with additional small quantities of the phosphate buffer. The column effluent is collected by fractions to recover the purified antigen or purified antigen mixture. The location of the antigen can be followed by a colorimetric test for carbohydrates using phenol-sulfuric acid reagent, in combination with observation of the appearance and termination of the opalescent character of the effluent. The purified antigen is also characterized by having little or no selective ultraviolet absorption; whereas fractions of the effluent having strong ultraviolet absorption contain nucleic acid type compounds and, in general, have much lower antigenic activity. The antigen-containing effluent is dialyzed against distilled water and lyophilized to give the purified antigen or mixture of antigens as a powder. A preferred method of purification is to subject the original crude antigen to a lower alkanol precipitation followed by fractionation on a gel filtration column.

Further in accordance with the invention, polyvalent vaccines are prepared from the polyvalent antigens described above by constituting them in an aqueous medium suitable for parenteral administration. For this purpose a solution of the selected polyvalent antigen is prepared in a sterile aqueous medium at a pH between about 6 to 8. For example, the selected polyvalent antigen is dissolved under sterile conditions in physiological saline buffered at pH 7.0–7.5 to give a suitable antigen concentration, typically 0.05 to 0.50 mg./ml. for each individual antigen; it being noted in this relationship (and regardless of whether or not further dilution or even concentration is carried out) that the ratio of any such antigen to each other such antigen is from 10:1 to 1:10 parts by weight. A preservative is added. A suitable preservative is thimerosal in a final concentration of 0.01 percent (weight/volume). The solution is, if necessary, centrifuged for clarification and sterilized. It is then suitable for vaccine use following potency and sterility checks.

In order to assay for potency, the polyvalent antigen or vaccine is given in graded amounts as a single subcutaneous injection in physiological saline to groups of mice. Three to seven days later the mice are challenged with an estimated 100 times the mean lethal dose (100 $LD_{50}$) of cultures of various strains of Pseudomonas aeruginosa given intraperitoneally in 0.5 ml. of 5 percent mucin. The fraction of animals surviving for 7 days at each dosage level is observed and the results are calculated in terms of the dose protecting 50 percent of the animals ($PD_{50}$). The $PD_{50}$ can be expressed in terms of nanograms/kilogram of mouse, where a nanogram is defined as 0.001 microgram.

The cultures of Pseudomonas aeruginosa used as starting materials in producing the polyvalent antigens and polyvalent vaccines of the invention can be obtained as follows, using aseptic techniques. A slant culture of the selected strain on a suitable agar medium is incubated at 35°–38° C. for about 12–24 hours or until visible growth appears. The organisms are then collected from the surface of the agar slant and suspended in sterile distilled water. This cell suspension is then used to inoculate a shake flask containing a suitable liquid nutrient medium. This shake flask culture is then shaken mechanically for 8 to 18 hours at 35°–38° C. The resulting seed culture is used to inoculate production growth fermentors containing a suitable liquid nutrient medium. The culture medium is maintained at 35°–38° C. and aerated at a rate of 1 to 2 volumes of air per volume of medium per minute for 8 to 18 hours. Samples are taken periodically to check for viability and purity, and growth is measured turbidimetrically. At this point it is customary to kill the culture by any conventional means which does not destroy the antigenic activity. A preferred method of killing the culture is by adding phenol to a concentration of 1 percent (weight/volume), mechanically agitating the phenol-treated culture for 30 to 60 minutes, and then allowing it to stand at 35°–38° C. for 2 to 5 hours. The phenol-killed cells are removed by centrifugation. The wet cell mass can be used immediately, or stored in the frozen state and thawed prior to use. It is also satisfactory to use unkilled cells in the antigen-extraction procedure with suitable extractants, in which case killing of the cells and antigen extraction can proceed concurrently.

The polyvalent antigens including the polyvalent vaccines of the invention are capable of stimulating the formation of protective antibodies. On parenteral administration they produce a degree of immunity not only against infection by the strains of Pseudomonas aeruginosa used in their preparation but also against infection by a number of other strains of Pseudomonas aeruginosa.

The gram-negative bacillus Pseudomonas aeruginosa causes serious and sometimes fatal infections. Very few drugs or antibiotics are available for treatment of those infections and the available agents are sometimes of no benefit against well-established infections. Furthermore, no satisfactory, specific, preventive measures have been developed for Pseudomonas aeruginosa infections. Serious Pseudomonas aeruginosa infections are found in man both as a primary disease and as a complicating factor in other conditions.

An antigen derived from any particular strain of Pseudomonas aeruginosa is not capable of inducing immunity against Pseudomonas aeruginosa broadly. An explanation for this lies in the fact that Pseudomonas aeruginosa subdivides into an unknown number of antigenic serotypes. The number of serotypes or sub-groups of Pseudomonas aeruginosa has been variously reported as 2, 4, 14, 25, and 29.

Thus, it is surprising that the polyvalent antigens of this invention containing a relatively small number of antigens from selected strains of Pseudomonas aeruginosa are capable of inducing immunity against a high percentage of randomly-encountered strains of Pseudomonas aeruginosa. A bivalent antigen of the invention provides protection against challenge by more than half of randomly-encountered strains; a hexavalent antigen of the invention provides protection against challenge by more than 80 percent of randomly-encountered strains; and a heptavalent antigen of the invention provides protection against challenge by more than 95 percent of randomly-encountered strains. Where protection is observed, the degree of protection varies somewhat with the specific strain used for challenge.

Still further in accordance with the invention, polyvalent pseudomonas immune globulin products are produced by administering the polyvalent antigens (including the polyvalent vaccines) of the invention to appropriate hosts (blood donors) followed by recovering immune globulin products from the hosts after an interval of time. The pseudomonas immune globulin products can be obtained as purified gamma globulin fractions or as immune whole blood products, immune plasmas, or immune serums. These products, as obtained according to the invention, are so-called "hyperimmune" products in that they contain a greater quantity of pseudomonas antibodies than the quantity found in a whole blood, plasma, serum, or purified globulin fraction from an untreated donor.

The process of collecting blood from donors and processing it according to any of a number of specific procedures to obtain an immune whole blood product, an immune plasma, an immune serum, or a purified immune globulin is well-known in the art. The specific improvement in this process according to the present invention lies in the prior administration to the donors of one or more parenteral doses of a polyvalent Pseudomonas aeruginosa antigen comprising immunizing antigens from the NRRL–B–3198 and NRRL–B–3200 strains of Pseudomonas aeruginosa, and optionally one or more additional immunizing antigens from one or more of the NRRL–B–3201, NRRL–B–NRRL–B–3203, NRRL–B–3223, and NRRL–B–3224 strains of Pseudomonas aeruginosa.

The hosts that can be used for administration of the polyvalent antigen and subsequent recovery of an immune globulin product include horses, cows, chickens, rabbits, and other animals. However, the use of these hosts presents certain disadvantages. For example, serum sickness can follow an injection of horse immune serum in clinical practice. The human is by far the preferred host for use in this process of the invention and the subsequent description will relate to the use of humans as the hosts.

In carrying out this process, prospective blood donors, preferably healthy adults, are selected for an immunization schedule. Each donor is given at least one parenteral injection of a polyvalent antigen of the invention. The polyvalent antigen used for administration comprises immunizing antigens from the NRRL-B-3198 and NRRL-B-3200 strains of *Pseudomonas aeruginosa* and optionally from one or more of the NRRL-B-3201, NRRL-B-3202, NRRL-B-3203, NRRL-B-3223, and NRRL-B-3224 strains of *Pseudomonas aeruginosa*. If desired, the donors can be given the polyvalent antigen by means of separate injections of the individual antigens of which it is composed. The polyvalent antigen can be prepared for use in a conventional aqueous medium or optionally in the presence of an adjuvant such as aluminum phosphate. The injection can best be given by the intramuscular or subcutaneous route in a convenient volume such as 0.1 to 1.0 ml. While it is possible to use only a single injection, it is preferred to give a series of injections, typically 3 or more, several days to several weeks apart, followed by a "booster" dose at a later date, if desired. The size of the doses is important in the sense that the larger the total amount of antigen injected, the greater is the resulting production of immune globulin. Normally the total amount of polyvalent antigen administered is between 0.1 mg. and 10.0 mg. per subject, given over a period of 7 days to 1 year.

Following the immunization procedure, blood is collected from the donors for processing. The time of collection of blood is important in producing an immune globulin product having a high antibody level. Normally at least 7 days and generally a longer period of time is allowed to pass before blood is collected. In general, it is preferred to collect the blood when it contains as high a proportion as possible of the so-called "7S" or "IgG" globulins rather than the "19S" or "IgM" globulins. The "7S" globulins are of relatively lower molecular weight than the "19S" globulins and are usually produced at a somewhat later time in the immune globulin response. A high proportion of the "7S" globulin is preferred because (a) it is fairly uniformly distributed throughout the body, (b) it has a longer "half-life" period, (c) it contains a preponderance of antibacterial antibodies, and (d) it has a greater ability to pass from the mother to the fetus in pregnancy. The latter factor is important because there is a high infection rate of pseudomonas in premature infants. In general, a high antibody level and a high proportion of "7S" globulin are obtained by collecting blood beginning a few weeks after the immunization procedure. However, the preferred times can be further selected by withdrawing small blood samples from time to time and testing them serologically for pseudomonas antibodies as well as for "7S" and "19S" globulins. The assay for "7S" and "19S" globulins is a known hemagglutination test based on pretreatment of the serum with 2-mercaptoethanol. The 2-mercaptoethanol destroys the "19S" globulin while leaving the "7S" globulin relatively intact.

The blood is collected by any acceptable procedure. One of these acceptable procedures is "plasmapheresis", in which the blood cells are separated and returned to the donor.

The blood collected from the donors is then processed by known methods to give an immune globulin either in the form of a purified globulin fraction or in the form of an immune whole blood product, an immune plasma, or an immune serum. The purified globulin fraction (gamma globulin) is customarily obtained by the Cohn cold ethanol precipitation procedure; see for example, Encyclopedia of Chemical Technology, Volume 2, pages 556-584 (1948). 0.0 weight. Other known procedures can also be used such as ammonium sulfate precipitation, electrophoretic procedures, chromatographic procedures, or gel filtration. A preferred product form is a sterile, aqueous solution of the purified globulin (gamma globulin). This solution contains approximately 165 mg. of purified globulin per cc., dissolved in a 2.25 percent solution of glycine and containing 0.2 percent sodium chloride and 0.01 percent thimerosal as a preservative, adjusted to pH 6.8 with sodium acetate buffer. For antipseudomonas therapy this product can be administered in a dosage from approximately 0.01 to 0.5 cc. per pound of body weight The preferred route of administration is by intramuscular injection.

The polyvalent immune globulin products of the invention, like the polyvalent antigens used in their production, are capable of immunizing against an unexpectedly high percentage of randomly-encountered strains of *Pseudomonas aeruginosa*.

The invention is illustrated by the following examples.

EXAMPLE 1

A wet cell mass of the NRRL-B-3203 strain of *Pseudomonas aeruginosa* weighing 90 g. is washed twice with water by decantation and then suspended in 150 ml. of cold distilled water. The suspension is blended and a solution of 60 g. of trichloroacetic acid in 150 ml. of water is added followed by blending as before. The suspension is diluted to a volume of 550 ml. with distilled water and stirred for 16 hours at 0° C. The suspension is centrifuged, the supernatant aqueous solution collected by decantation, the residual solid washed twice with 100 ml. portions of water, and the washings added to the aqueous solution. The aqueous solution is washed successively with 150 ml. portions of ether until it is only weakly acidic. It is then aerated for a short time to remove residual ether. The solution is dialyzed against cold distilled water and then lyophylized to give crude *Pseudomonas aeruginosa* NRRL-B-3203 antigen.

By the foregoing procedure, the crude antigens are prepared from the NRRL-B-3198, NRRL-B-3200, NRRL-B-NRRL-B-3202, and NRRL-B-3224 strains of *Pseudomonas aeruginosa*.

By microanalysis the crude antigens contain: carbon, 37-43 percent; hydrogen, 6-7 percent; nitrogen, 5-8 percent; phosphorus, 3-5 percent; sulfur, 0.5-0.9 percent; ash, 10-15 percent. The ultraviolet spectrum in pH 7 phosphate buffer shows an absorption maximum at 258 millimicrons; $E_{11}$ = 50-80.

The crude antigen from stains NRRL-B-3200 and NRRL-B-3224 are each further processed as follows. The crude antigen is dissolved in 0.1 N aqueous sodium acetate to make a 10 percent (weight/volume) solution. The solution is cooled to 0° C. and treated slowly with six volumes of absolute ethanol to precipitate the antigen. The precipitated antigen is collected by centrifugation and dissolved in water. The aqueous solution is dialyzed against distilled water and lyophylized to give the partially purified antigen.

Twenty-five mg. each of the crude antigen from strains NRRL-B-3198, NRRL-B-3201, NRRL-B-3202, and NRRL-B-3203 and of the partially purified antigen from strains NRRL-B-3200 and NRRL-B-3224 are combined and dissolved in the minimum volume of a phosphate buffer (prepared to contain 0.02 molar sodium dihydrogen phosphate and 0.20 molar sodium chloride, and adjusted to pH 7.0 with dilute sodium hydroxide). The solution is added to a column, 1.5 × 25 cm., containing a cross-linked dextran polymer which has been equilibrated with the same buffer. The polymer used should have a pore size appropriate to exclude. particles having an approximate molecular weight greater than about 200,000. A material available under the name Sephadex G-200, as well as substances of similar properties, as described in British Pat. No. 854,715 and U.S. Pat. No. 3,105,012 can be used. The column is eluted with additional small quantities of the phosphate buffer and the effluent containing the mixed antigens is collected. This effluent is dialyzed against distilled water and then lyophylized to give a mixture of the six purified antigens as a white powder. The product is characterized by having little or no ultraviolet absorption in the region of 240-300 millimicrons in buffered solution.

To demonstrate the range of effectiveness of the hexavalent antigen, as prepared above, in providing protection against Pseudomonas aeruginosa infection, mice were given a single subcutaneous 10 microgram dose of the purified hexavalent antigen dissolved in 0.25 ml. of physiological saline. One week later the mice were challenged by an intraperitoneal injection of cultures of strains of Pseudomonas aeruginosa in 0.5 ml. of 5 percent mucin at the estimated 100 $LD_{50}$ level. A total of 315 strains of *Pseudomonas aeruginosa* were used in challenges. All cultures were of human origin and came from various institutions widely distributed in the United States. Pronounced protection against infection in mice was obtained against 242 (77 percent) of the challenge strains, lesser protection was obtained against 24 (7.6 percent) and no protection was obtained against 49 (15.5 percent).

To assay for potency, the hexavalent antigen was given in graded amounts as a single subcutaneous injection dissolved in 0.25 ml. of physiological saline to CF-1 female mice, using groups of 15 mice per dose level. Three days later sets of mice were challenged with an estimated 100 $LD_{50}$ of cultures of each of the six Pseudomonas aeruginosa strains from which the hexavalent antigen was derived. The challenges were given intraperitoneally in 0.5 ml. of 5 percent mucin. The following results were obtained.

| Challenge Strain, NRRL Number | Protective Dose 50% ($PD_{50}$) in Nanograms/Kilogram of Mouse |
|---|---|
| B-3198 | 35 |
| B-3200 | 15 |
| B-3201 | 25 |
| B-3202 | 10 |
| B-3203 | 6 |
| B-3224 | 16 |

A vaccine product is prepared as follows. Using aseptic parenteral and sterile reagents and equipment, the hexavalent antigen, prepared as described above, is dissolved in pH 7.2 phosphate buffered saline to give a concentration of 0.5 mg./ml. Thimerosal is added to give a final concentration of of 0.01 percent (weight/volume). The solution is lightly centrifuged to remove any extraneous matter present and then heated at 60° C. for 60 minutes. The resulting solution is suitable for vaccine use after potency and sterility checks.

The starting materials, that is the wet cell masses of *Pseudomonas aeruginosa* strains NRRL–B–3198, NRRL–B–3200, NRRL–B–NRRL–B–3203, NRRL–B–3203, and NRRL–B–3224, are obtained as follows. A slant culture of the designated strain is grown for 16 hours at 37° C. on an agar medium prepared by dissolving 15 g. of pancreatic digest of casein, 5 g. of papaic digest of soya meal, 5 g. of sodium chloride, and 15 g. of agar in 1,000 ml. of distilled water and autoclaving the solution. A product such as Trypticase Soy Agar (Baltimore Biological Laboratory, Inc.) can be used. The organisms are collected from the surface of the agar slant and suspended in sterile distilled water. This cell suspension is used to inoculate a shake flask containing 600 ml. of a broth prepared by dissolving 17 g. of pancreatic digest of casein, 3 g. of papaic digest of soya meal, 5 g. of sodium chloride, 2.5 g. of dipotassium phosphate, and 2.5 g. of dextrose in 1,000 ml. of distilled water and autoclaving the solution. A product such as Trypticase Soy Broth (Baltimore Biological Laboratory, Inc.) can be used. This shake flask culture is then shaken mechanically for 12 hours at 37° C. The resulting seed culture is used to inoculate a final growth phase of 16 liters of a broth prepared as described above. The culture is maintained at 37° C. with aeration at a rate of 1.5 volumes of air per volume of medium per minute for 12 hours. Samples are taken periodically to check for viability and purity, and growth is measured turbidimetrically. At the end of the incubation period, 166 g. of phenol is added and the mixture is stirred for 30 minutes, then allowed to stand at 37° C. for 4 hours. The cell mass is removed by centrifugation and may be used immediately; or stored in the frozen state and then allowed to thaw prior to use.

EXAMPLE 2:

By the general procedure of Example 1, a wet cell mass of each of the NRRL–B–3198, NRRL–B–3200, NRRL–B–3201, NRRL–B–NRRL–B–3203, NRRL–B–3223, and NRRL–B–3224 strains of *Pseudomonas aeruginosa* is extracted with aqueous trichloroacetic acid to give a crude antigen. Each of the seven crude antigens is partially purified by dissolving it in 0.1 N aqueous sodium acetate to make a 10 percent (weight/volume) solution, cooling the solution to 0° C., and precipitating the antigen by slowly adding six volumes of absolute ethanol, as described in Example 1.

Each of the above seven partially purified antigens is separately purified as follows. The partially purified antigen, 500 mg., is dissolved in the minimum volume of a phosphate buffer (prepared to contain 0.02 molar sodium dihydrogen phosphate and 0.20 molar sodium chloride, and adjusted to pH 7.0 with dilute sodium hydroxide). The solution is added to a column 3 × 25 cm., containing a polyacrylamide which has been equilibrated with the same buffer. A material available under the name Bio-Gel P–100, as well as polyacrylamides of similar pore size capable of excluding particles having a molecular weight greater than about 100,000, can be used. After a 25 ml. holdup volume is collected and discarded, the solution of the antigen is collected by following the appearance and termination of its opalescent character. Additional small quantities of the phosphate buffer are used to remove the last portion of the antigen from the column. The effluent containing antigen is dialyzed against distilled water and then lyophilized to give the purified antigen as a white powder. The product is characterized by having little or no ultraviolet absorption in the region of 240–300 millimicrons in buffered solution. Equal weights of each of the seven purified antigens thus obtained are combined to give a heptavalent antigen.

To demonstrate the range of effectiveness of the heptavalent antigen as prepared above in providing protection against *Pseudomonas aeruginosa* infection, mice were given a single subcutaneous 10 microgram dose of the purified heptavalent antigen dissolved in 0.25 ml. of physiological saline. One week later the mice were challenged by an intraperitoneal injection of cultures of strains of *Pseudomonas aeruginosa* in 0.5 ml. of 5 percent mucin at the estimated 100 $LD_{50}$ level. A total of 342 strains of *Pseudomonas aeruginosa* were used in challenges. All cultures were of human origin and came from various institutions widely distributed in the United States. Pronounced protection against infection in mice was obtained against 300 (87.7 percent) of the challenge strains, lesser protection was obtained against 33 (9.6 percent), and no protection was obtained against 9 (2.6 percent).

Using aseptic technique and sterile reagents and equipment, a heptavalent vaccine solution is prepared as described in Example 1.

The starting materials, that is the wet cell masses of the seven strains of *Pseudomonas aeruginosa*, are obtained by the procedure described in Example 1.

EXAMPLE 3

By following the general procedure of Example 2, crude antigens are prepared from the NRRL–B–3198 and NRRL–B–3 200 strains of *Pseudomonas aeruginosa*, and the crude antigens are further processed to give the partially purified antigens and the purified antigens. Equal weights of the two purified antigens thus obtained are combined to give a divalent antigen.

The range of effectiveness of the divalent antigen as prepared above was determined in mice by the general procedure described in Example 2. A total of 27 randomly selected strains of *Pseudomonas aeruginosa* were used in challenges. Pronounced protection against infection in mice was obtained against 16 (59.2 percent) of the challenge strains.

Using aseptic technique and sterile reagents and equipment, a divalent vaccine solution is prepared, as described in the previous examples.

Trivalent, quadrivalent, pentavalent, and hexavalent antigens and vaccines are prepared by adding one or more antigens prepared from any of the NRRL–B–3201, NRRL–B–3202, NRRL–B–3203, NRRL–B–3223, and NRRL–B–3224 strains of *Pseudomonas aeruginosa* to the divalent antigen and vaccine of the present example.

EXAMPLE 4

Following the general methods of the preceding examples, a heptavalent antigen is prepared in the form of a vaccine having the following concentrations of immunizing antigens.

| Antigen From NRRL Number | Mg./Ml. |
|---|---|
| B-3198 | 0.10 |
| B-3200 | 0.10 |
| B-3201 | 0.15 |
| B-3202 | 0.15 |
| B-3203 | 0.10 |
| B-3223 | 0.10 |
| B-3224 | 0.15 |

Normal human adults are divided into blood donor Groups A, B, C, and D and are given intramuscular injections of the heptavalent antigen described above according to the following schedule. The weights shown below represent total antigen weight.

Each subject in Group A receives 0.4 mg. antigen at the beginning of treatment and 0.4 mg. antigen 7 days later.

Each subject in Group B receives 0.4 mg. antigen at the beginning of treatment, 0.4 mg. antigen 7 days later, and 0.4 mg. antigen after an additional 7 days.

Each subject in Group C receives 0.6 mg. antigen at the beginning of treatment, 0.6 mg. antigen 7 days later, and 0.6 mg. antigen after an additional 7 days.

Each subject in Group D receives 0.8 mg. antigen at the beginning of treatment, 0.8 mg. antigen 7 days later, and 0.8 mg. antigen after an additional 7 days.

Blood is collected from each blood donor on day 7 and at intervals thereafter, to provide an immune whole blood product. The fluid portion is separated to give an immune plasma. The plasma is allowed to clot and the clear fluid removed as an immune serum. The serum is assayed for pseudomonas antibodies by a mouse protection test or a hemagglutination test.

In order to carry out the mouse protection test, mice are injected intraperitoneally with 100 $LD_{50}$ of a *Pseudomonas aeruginosa* challenge strain, suspended in 0.3 ml. of 5 percent hog gastric mucin. Within 30 minutes following this challenge injection, subgroups of the mice are injected intraperitoneally with serum or a serial dilution of serum in saline, each mouse receiving a total volume of 0.25 ml. The fraction of animals surviving for 7 days at each serum dilution is observed. The results are plotted for a range of dilutions and the serum dilution protecting 50 percent of the animals is obtained from the graph. This value is designated as the 50 percent protective dilution, or $PD_{50}$, and can be expressed directly as the dilution (for example 1:160 or 1:320) or as the corresponding reciprocal dilution titers (160 or 320). The reciprocal dilution titers can be expressed in terms of a geometric mean value for the treatment group.

The results observed with serums obtained from treatment Groups A, B, C, and D described above, using the mouse protection test and challenges with 100 $LD_{50}$ of NRRL–B–3198 or 100 $LD_{50}$ of NRRL–B–3201, are shown in the following table.

| Group | Day Blood Collected | Pseudomonas Antibody Serum Titer* Challenge Strain NRRL-B-3198 | NRRL-B-3201 |
|---|---|---|---|
| A | pre-injection | 19 | 54 |
| | 7 | 93 | 105 |
| | 14 | 135 | 327 |
| | 21 | 170 | 224 |
| | 28 | 161 | 227 |
| | 35 | 125 | 199 |
| B | pre-injection | 19 | 33 |
| | 7 | 73 | 104 |
| | 14 | 225 | 285 |
| | 21 | 184 | 365 |
| | 28 | 214 | 389 |
| | 35 | 232 | 398 |
| | 42 | 213 | 345 |
| C | pre-injection | 3 | 40 |
| | 7 | 24 | 186 |
| | 14 | 55 | 307 |
| | 21 | 53 | 310 |
| | 28 | 60 | 335 |
| | 35 | 68 | 201 |
| | 42 | 35 | 193 |
| D | pre-injection | 8 | 46 |
| | 7 | 65 | 103 |
| | 14 | 87 | 211 |
| | 21 | 128 | 265 |
| | 28 | 89 | 268 |
| | 35 | 92 | 322 |
| | 42 | 162 | 343 |

*Geometric means of reciprocal dilution titers (reciprocal $PD_{50}$). The magnitude of these numbers is directly proportional to antibody content.

The serums from treatment Groups A, B, C, and D contain similarly increased antibody titers against challenge with any of the NRRL-B-3200, NRRL-B-3202, NRRL-B-3203, NRRL-B-3223, and NRRL-B-3224 strains of *Pseudomonas aeruginosa*. The serums from treatment Groups A, B, C, and D also show increased antibody titers against challenge with the great majority of randomly-encountered strains of Pseudomonas aeruginosa. The increased antibody titers can be demonstrated by hemagglutination assay as well as by the mouse protection test.

By the general procedures of this example, one can also obtain immune whole blood products, immune plasmas, and immune serums from blood donor groups pretreated with polyvalent *Pseudomonas aeruginosa* antigen comprising immunizing antigens from the NRRL–B–3198 and NRRL–B–3200 strains and optionally containing one or more immunizing antigens from one or more of the NRRL–B–3201, NRRL–B–3202, NRRL–B–3203, NRRL–B–3223, and NRRL–B–3224 strains.

Example 5

A heptavalent *Pseudomonas aeruginosa* antigen is prepared in the form of a vaccine having the antigen concentrations shown in Example 4. A blood donor group consisting of normal human adults is given an immunization schedule of this heptavalent vaccine by intramuscular injection. Each subject receives 1.0 mg. total antigen at the beginning of the treatment schedule, 1.0 mg. total antigen 7 days later, and 1.0 mg. total antigen after an additional 7 days. Blood is collected from the donors at periods of 1, 2, 3, 4, 5, and 6 weeks from the beginning of the treatment schedule. Individual serum samples are separated and assayed for pseudomonas antibodies by a hemagglutination test.

In carrying out this test, red blood cells (usually from sheep) are coated with antigen by exposing a 10 percent suspension of red blood cells to a solution of 0.1 mg. antigen/ml. for 30 minutes at 37° C. Serum to be assayed is serially diluted in test tubes to provide a sequence of serum dilutions in saline. A constant volume of antigen-coated red cells is added to each test tube and allowed to interact with serum. The presence of antibody is indicated by a settling out of the red blood cells (agglutination or hemagglutination). The highest dilution of serum which causes distinct hemagglutination is the antibody titer. This titer can be expressed directly as a dilution (for example 1:160 or 1:320) or as the corresponding reciprocal dilution titers (160 or 320). The hemagglutination test is preformed similarly on plasmas or purified globulin fractions using serial dilutions of those products. The hemagglutination test as performed using antigens from individual strains of *Pseudomonas aeruginosa is in general agreement with the mouse protection test employing challenges with the same strains of Pseudomonas aeruginosa*, insofar as determining relative antibody levels present in the immune whole blood product, immune plasma, immune serum, or purified immune globulin.

The ratio of "7S" to "19S" antibody levels in the serums from the treatment group described above is determined by performing the hemagglutination test on samples before and after treatment with 2-mercaptoethanol. The 2-mercaptoethanol destroys the "19S" globulin while leaving the "7S" globulin relatively intact. By this procedure, it is found that the combined "7S" and "19S" globulins contain up to approximately 20 percent of the "7S".

The serums obtained from this treatment group are fractionated by the Cohn cold ethanol precipitation procedure to obtain a purified immune globulin (gamma globulin). This purified globulin is constituted in a sterile, aqueous solution containing 165 mg. of purified globulin per cc., dissolved in a 2.25 percent solution of glycine and containing 0.2 percent sodium chloride and 0.01 percent thimerosal as a preservative, adjusted to pH 6.8 with sodium acetate buffer. By the hemagglutination assay described above, this product has reciprocal dilution antibody titers of 2,560 to 20,000, measured against individual antigens from the NRRL–B–3198, NRRL–B–3200, NRRL–B–NRRL–B–3202, NRRL–B–3203, NRRL–B– 3223, and NRRL–B–3224 strains of *Pseudomonas aeruginosa*. The product also has high titers against the majority of randomly-encountered strains of *Pseudomonas aeruginosa*. Regularly-available gamma globulin preparations obtained from untreated blood donors and constituted as 16 percent aqueous solutions have antibody titers of approximately 40, determined against various strains of *Pseudomonas aeruginosa* by the same hemagglutination assay.

By the general procedure of this example, one can also obtain purified immune globulins from blood donor groups pretreated with polyvalent *Pseudomonas aeruginosa* antigen comprising immunizing antigens from the NRRL–B–3198 and NRRL–B–3200 strains and optionally containing one or more immunizing antigens from one or more of the NRRL–B–3201, NRRL-B-3202, NRRL-B-3203, NRRL-B-3223, and NRRL-B-3224 strains.

We claim:

1. A polyvalent *Pseudomonas aeruginosa* antigen comprising, in combination, immunizing antigens from the NRRL–B–3198 and NRRL–B–3200 strains of *Pseudomonas aeruginosa*; the ratio of one of said immunizing antigens to the other of said immunizing antigens being from 10:1 to 1:10 parts by weight.

2. A polyvalent antigen according to claim 1, in the form of a vaccine.

3. A polyvalent antigen according to claim 1, and containing an additional immunizing antigen from the NRRL–B–3201 strain of *Pseudomonas aeruginosa;* the ratio of one of said immunizing antigens to each other of said immunizing antigens being from 10:1 to 1:10 parts by weight.

4. A polyvalent antigen according to claim 3, in the form of a vaccine.

5. A polyvalent antigen according to claim 1, and containing an additional immunizing antigen from the NRRL–B–3202 strain of *Pseudomonas aeruginosa;* the ratio of one of said immunizing antigens to each other of said immunizing antigens being from 10:1 to 1:10 parts by weight.

6. A polyvalent antigen according to claim 5, in the form of a vaccine.

7. A polyvalent antigen according to claim 1, and containing an additional immunizing antigen from the NRRL–B–3203 strain of *Pseudomonas aeruginosa;* the ratio of one of said immunizing antigens to each other of said immunizing antigens being from 10:1 to 1:10 parts by weight.

8. A polyvalent antigen according to claim 7, in the form of a vaccine.

9. A polyvalent antigen according to claim 1, and containing an additional immunizing antigen from the NRRL–B–3223 strain of *Pseudomonas aeruginosa:* the ratio of one of said immunizing antigens to each other of said immunizing antigens being from 10:1 to 1:10 parts by weight.

10. A polyvalent antigen according to claim 9, in the form of a vaccine.

11. A polyvalent antigen according to claim 1, and containing an additional immunizing antigen from the NRRL–B–3224 strain of *Pseudomonas aeruginosa;* the ratio of one of said immunizing antigens to each other of said immunizing antigens being from 10:1 to 1:10 parts by weight.

12. A polyvalent antigen according to claim 11, in the form of a vaccine.

13. A polyvalent antigen according to claim 1, comprising, in combination, immunizing antigens from the NRRL–B–3 198, NRRL–B–3200, NRRL–B–3201, NRRL–B–3202, NRRL–B–and NRRL–B–3224 strains of *Pseudomonas aeruginosa;* the ratio of one of said immunizing antigens to each other of said immunizing antigens being from 10:1 to 1:10 parts by weight.

14. A polyvalent antigen according to claim 13, in the form of a vaccine.

15. A polyvalent antigen according to claim 1, comprising, in combination, immunizing antigens from the NRRL–B–3 198, NRRL–B–3200, NRRL–B–3201, NRRL–B–3202, NRRL–B–NRRL–B–3223, and NRRL–B–3224 strains of *Pseudomonas aeruginosa;* the ratio of one of said immunizing antigens to each other of said immunizing antigens being from 10:1 to 1:10 parts by weight.

16. A polyvalent antigen according to claim 15, in the form of a vaccine.

17. In a process for the production of an immune globulin by collecting blood from donors and processing it to obtain an immune whole blood product, an immune plasma, an immune serum, or a purified immune globulin; the improvement which comprises administering to the donors, at least 7 days prior to collecting blood, a parenteral injection of at least 0.1 mg. of a polyvalent Pseudomonas aeruginosa antigen comprising immunizing antigens from the NRRL–B–3198 and NRRL–B–3 200 strains of *Pseudomonas aeruginosa;* the ratio of one of said immunizing antigens to the other of said immunizing antigens being from 10:1 to 1:10 parts by weight.

18. Process according to claim 17 wherein the polyvalent antigen contains an additional immunizing antigen from the NRRL–B–3201 strain of *Pseudomonas aeruginosa;* the ratio of one of said immunizing antigens to each other of said immunizing antigens being from 10:1 to 1:10 parts by weight.

19. Process according to claim 17 wherein the polyvalent antigen contains an additional immunizing antigen from the NRRL–B–3202 strain of *Pseudomonas aeruginosa;* the ratio of one of said immunizing antigens to each other of said immunizing antigens being from 10:1 to 1:10 parts by weight.

20. Process according to claim 17 wherein the polyvalent antigen contains an additional immunizing antigen from the NRRL–B–3203 strain of *immunizing Pseudomonas aeruginosa;* the ratio of one of said imminizing antigens to each other of said immunizing antigens being from 10:1 to 1:10 parts by weight.

21. Process according to claim 17 wherein the polyvalent antigen contains an additional immunizing antigen from the NRRL–B–3223 strain of *Pseudomonas aeruginosa;* the ratio of one of said immunizing antigens to each other of said immunizing antigens being from 10:1 to 1:10 parts by weight.

22. Process according to claim 17 wherein the polyvalent antigen contains an additional immunizing antigen from the NRRL–B–3224 strain of *Pseudomonas aeruginosa;* the ratio of one of said immunizing antigens to each other of said immunizing antigens being from immunizing to 1:10 parts by weight.

23. Process according to claim 17 wherein the polyvalent antigen comprises immunizing antigens from the NRRL–B–3

198, NRRL-B-3200, NRRL-B-3201, NRRL-B-3202, NRRL-B-3203, NRRL-B-3223, and NRRL-B-3224 strains of *Pseudomonas aeruginosa*; the ratio of one of said immunizing antigens to each other of said immunizing antigens being from 10:1 to 1:10 parts by weight.

24. Process according to claim 17 wherein the parenteral injection of the polyvalent antigen is an intramuscular injection.

25. Process according to claim 17 wherein the parenteral injection of the polyvalent antigen is a subcutaneous injection.

26. Process according to claim 17 wherein a plurality of parenteral injections of the polyvalent antigen are given prior to collecting blood.

27. Process according to claim 17 wherein the total weight of the polyvalent antigen given to a single human subject prior to collecting blood is between 0.1 and 10 mg.

28. An immune globulin produced by the process of collecting blood from donors and processing it to obtain an immune whole blood product, an immune plasma, an immune serum, or a purified immune globulin, said process incorporating the improvement which comprises administering to the donors, at least 7 days prior to collecting blood, a parenteral injection of at least 0.1 mg. of a polyvalent *Pseudomonas aeruginosa* antigen comprising injection immunizing antigens from the NRRL-B-3198 and NRRL-B-3200 strains of *Pseudomonas aeruginosa*; the ratio of one of said immunizing antigens to the other of said immunizing antigens being from 10:1 to 1:10 parts by weight.

* * * * *